United States Patent
Kahn

(10) Patent No.: US 12,282,593 B2
(45) Date of Patent: Apr. 22, 2025

(54) VIRTUAL REALITY DEVICE WITH AMBIENT AUDIO SYNCHRONIZATION

(71) Applicant: ARRIS Enterprises LLC, Suwanee, GA (US)

(72) Inventor: Michael Kahn, Cherry Hill, NJ (US)

(73) Assignee: ARRIS ENTERPRISES LLC, Horsham, PA (US)

( * ) Notice: Subject to any disclaimer, the term of this patent is extended or adjusted under 35 U.S.C. 154(b) by 0 days.

(21) Appl. No.: 18/114,392

(22) Filed: Feb. 27, 2023

(65) Prior Publication Data
US 2023/0288983 A1    Sep. 14, 2023

Related U.S. Application Data

(60) Provisional application No. 63/317,625, filed on Mar. 8, 2022.

(51) Int. Cl.
G06F 3/01      (2006.01)
G06F 3/0482    (2013.01)
G06F 3/16      (2006.01)

(52) U.S. Cl.
CPC ............ G06F 3/011 (2013.01); G06F 3/0482 (2013.01); G06F 3/165 (2013.01)

(58) Field of Classification Search
CPC .......... G06F 3/011; G06F 3/165; G06F 3/167; G06F 3/0482
See application file for complete search history.

(56) References Cited

U.S. PATENT DOCUMENTS

| 2006/0185501 A1* | 8/2006 | Shiraishi ................. G10H 1/40 84/612 |
| 2006/0266200 A1 | 11/2006 | Goodwin |
| 2011/0067555 A1* | 3/2011 | Sugai ....................... G10H 1/40 84/612 |
| 2015/0238811 A1 | 8/2015 | Nicolas et al. |
| 2018/0198990 A1* | 7/2018 | Greenberger ........ H04N 5/2621 |
| 2018/0214777 A1 | 8/2018 | Hingorani |
| 2021/0252340 A1 | 8/2021 | Smith |
| 2021/0295578 A1* | 9/2021 | Lee ......................... G06V 40/23 |
| 2022/0152491 A1* | 5/2022 | Hall ........................ A63F 13/56 |

OTHER PUBLICATIONS

International Search Report and Written Opinion mailed Aug. 8, 2023 in International Application No. PCT/US2023/014824.
International Preliminary Report on Patentability dated Sep. 10, 2024 in International (PCT) Application No. PCT/US2023/014824.

* cited by examiner

*Primary Examiner* — Liliana Cerullo
(74) *Attorney, Agent, or Firm* — Wenderoth, Lind & Ponack, L.L.P.

(57) ABSTRACT

To provide an enhanced user experience, a virtual reality device provides one or more virtual reality activities for selection based on a tempo of an audio input detected. The audio input can be ambient audio within proximity of a user of the virtual reality device. The tempo can be determined by the virtual reality device based, for example, on a beats per minute. The one or more virtual reality activities can be associated with a tempo, one or more user preferences, and/or historical data. The virtual reality device can automatically or allow a user to select a virtual reality virtual reality activity associated with the tempo. The virtual reality device can synchronize the selected virtual reality activity to the tempo.

20 Claims, 4 Drawing Sheets

| Interpeak time | Real Time Clock Next Peak Estimate |
|---|---|
| 480ms | 839382 |

VIRTUAL REALITY DEVICE WITH AMBIENT AUDIO SYNCHRONIZATION

BACKGROUND

Virtual reality systems have gained popularity in various fields, such as gaming and other immersive experiences. As innovations in technology, healthcare and virtual reality continue to expand and intertwine, users are combining diverse experiences to various applications. For example, virtual reality systems can be combined with music to provide a user with an improved experience. However, such virtual reality systems do not seamlessly integrate with the musical expectations or requests associated with a user. Thus, there is a need to seamless integrate ambient music with the virtual reality system to provide a user with an improved experience.

SUMMARY

Generally, there are many devices in the market that operate or behave as point solutions for specific user experiences. Each solution may have an associated device and an associated application that runs on the associated device. However, these solutions or technologies can require that a user have unique knowledge of a network or specific application to integrate technologies. For example, a user can use a virtual reality system to provide an immersive experience. Virtual reality system have proven beneficial for biometrics including improving overall health especially with respect to certain medical conditions, for example, users suffering from Parkinson's disease can utilize virtual reality systems to improve physical motor performance especially with respect to virtual reality activities to encourage and promote limb movement, including, but not limited to, shadow boxing, dancing, and/or any other activities that facilitate body movement.

Activities associated with a virtual reality system can often require a music library to stimulate a user to perform the corresponding movements by synchronizing the music to the activity. However, current virtual reality systems have drawbacks such as there is a limited catalog of available music for synchronization with a particular activity and the catalog of available music can oftentimes only be available via an internet connection to a network resource, such as a repository or library. Such drawbacks restrict or prevent use of a virtual reality system especially where internet access is limited or nonexistent. Thus, the present invention improves virtual reality systems by providing synchronization of ambient music to an activity provided by the virtual reality system. Such improvement can facilitate not only wider variety of music available for a virtual reality system but can also allow for advancement of aging-in-place by providing user preferred music or music that incentivizes a user to perform certain beneficial body movements. In this way, music is not limited only to an internet and/or subscription based sources but can be provided from any source, such as an audio output system, capable of providing an audio output.

An aspect of the present disclosure provides a virtual reality device for selecting a virtual reality activity. The virtual reality device comprises a memory storing one or more computer-readable instructions and a processor configured to execute the one or more computer-readable instructions to detect an audio input from an audio output system, determine a tempo of the audio input for a time period, determine one or more virtual reality activities based on the tempo, select the virtual reality activity from the one or more virtual reality activities, and synchronize the selected virtual reality activity to the tempo.

In an aspect of the present disclosure, the tempo is determined as a beats per minute.

In an aspect of the present disclosure, the time period comprises at least one minute.

In an aspect of the present disclosure, the audio input comprises ambient audio.

In an aspect of the present disclosure, the processor is further configured to execute the one or more instructions to provide to a display device of the virtual reality device a visual interface, wherein the visual interface comprises a listing of the one or more virtual reality activities, and wherein selecting the virtual reality activity comprises receiving a user input from the visual interface, wherein the user input is associated with the selected virtual reality activity.

In an aspect of the present disclosure, wherein selecting the virtual reality activity comprises receiving a user input from the visual interface, wherein the user input is associated with the selected virtual reality activity.

In an aspect of the present disclosure, the processor is further configured to execute the one or more instructions to identify one or more amplitude peaks in the audio input, determine that the one or more amplitude peaks occur in a periodic pattern, and wherein the tempo is determined based on the periodic pattern.

An aspect of the present disclosure provides a method for selecting a virtual reality activity. The method comprises detecting an audio input from an audio output system, determining a tempo of the audio input for a time period, determining one or more virtual reality activities based on the tempo, selecting the virtual reality activity from the one or more virtual reality activities, and synchronizing the selected virtual reality activity to the tempo.

In an aspect of the present disclosure, the method is such that the tempo is determined as a beats per minute.

In an aspect of the present disclosure, the method is such that the time period comprises at least one minute.

In an aspect of the present disclosure, the method is such that the audio input comprises ambient audio.

In an aspect of the present disclosure, the method further comprises providing to a display device of the virtual reality device a visual interface, wherein the visual interface comprises a listing of the one or more virtual reality activities, and wherein selecting the virtual reality activity comprises receiving a user input from the visual interface, wherein the user input is associated with the selected virtual reality activity.

In an aspect of the present disclosure, the method is such that selecting the virtual reality activity comprises receiving a user input from the visual interface, wherein the user input is associated with the selected virtual reality activity.

In an aspect of the present disclosure, the method further comprises identifying one or more amplitude peaks in the audio input, determining that the one or more amplitude peaks occur in a periodic pattern, and wherein the tempo is determined based on the periodic pattern.

An aspect of the present disclosure provides a non-transitory computer-readable medium of a virtual reality device storing one or more instructions for selecting a virtual reality activity. The one or more instructions when executed by a processor of the virtual reality device, cause the virtual reality device to perform one or more operations including the steps of the methods described above.

Thus, according to various aspects of the present disclosure described herein, it is possible to provide an improved user experience associated with a virtual reality device. The novel solution(s) provide a synchronization of a music associated with a user, such as an ambient audio input, to a virtual reality activity of a virtual reality device so as to facilitate, encourage, or otherwise motivate a user to participate, such as by one or more body movements. The novel solution(s) include software and/or hardware within a virtual reality device to perform tempo or beat detection on an ambient audio input, and report synchronization and tempo information to a processor of the virtual reality device. The virtual reality device can then be used in a standalone (for example, offline) mode. Furthermore, the storage limitations, licensing limitations, selection limitations, etc. can be eliminated or diminished, as the user can provide an audio input (for example, at the location of the virtual reality device). In this way, the user is more engaged as the user preferred music is synchronized with a corresponding virtual reality activity.

BRIEF DESCRIPTION OF DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
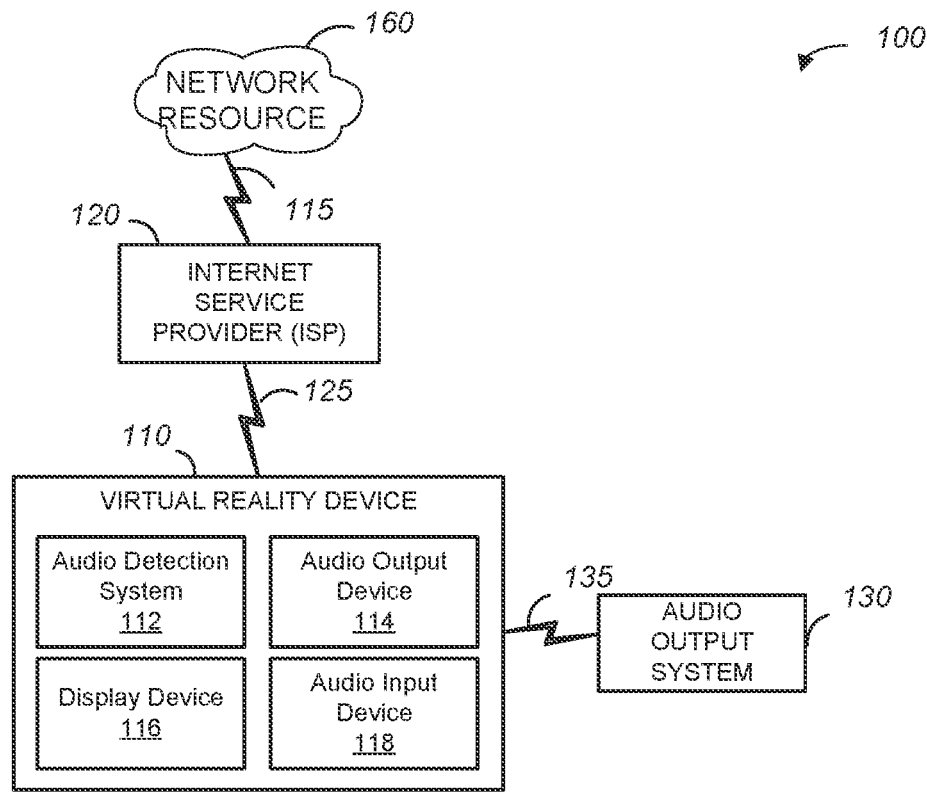
FIG. 1 is a schematic diagram of a virtual reality system, according to one or more aspects of the present disclosure.

FIG. 1 is a schematic diagram of a virtual reality system 100, according to one or more aspects of the present disclosure. For example, the virtual reality system 100 can provide a user with one or more customized virtual reality activities based on an audio input, such as ambient audio. An example virtual reality system 100 can be related to a caregiving network for a user (a patient) such that one or more aspects associated with the user (for example, biometric activity, a limb or body movement activity, etc.) can be provided so as to customize an experience associated with a virtual reality activity to a user. For example, a virtual reality activity can be selected based on the audio input.

It should be appreciated that various example embodiments of inventive concepts disclosed herein are not limited to specific numbers or combinations of devices, and there may be one or multiple of some of the aforementioned electronic apparatuses in the network environment, which may itself consist of multiple communication networks and various known or future developed wireless connectivity technologies, protocols, devices, and the like.

As shown in FIG. 1, the virtual reality system 100 can comprise a virtual reality device 110 connected to a network resource 160 via a connection 115 to an Internet service provider (ISP) 120 and a connection 115 between the ISP 120 and the network resource 160. The virtual reality system 100 shown in FIG. 1 includes wired and/or wireless network devices (for example, a virtual reality device 110 and/or an audio output system 130) that may be connected in one or more wireless networks (for example, private, guest, iControl, backhaul network, or Internet of things (IoT) network) and/or wired networks within the network environment 100.

The ISP 120 can be, for example, a content provider or any computer for connecting the virtual reality device 110 to a network resource 160, such as the Internet. For example, network resource 160 can be a cloud-based service that provides access to a cloud-based repository accessible via ISP 120 where the cloud-based repository comprises information associated with audio, such as a music catalog, one or more virtual reality activities, or both.

The virtual reality device 110 can provide a user with a virtual reality experience by providing one or more virtual reality activities available for selection via a user interface of the virtual reality device 110. The virtual reality device 110 can comprise any of a goggle, a headset, a helmet, an apparatus that fits about the circumference of a head of a user, any other device capable of providing a virtual reality experience to a user, or any combination thereof. In one or more embodiments, the virtual reality device 110 can communicate with any one or more external and/or internal repositories of ISP 120, such as one or more network resources 160. The one or more network resources 160 can comprise a music catalog or any other resource that provides music such as a subscription and/or licensing audio service.

The connection 115 between the ISP 120 and the network resource 160, the connection 125 between the virtual reality device 110 and the ISP 120, and the connection 135 between the virtual reality device 120 and the audio output system 130 can be implemented using a virtual connection (over the air), a wide area network (WAN), a virtual private network (VPN), metropolitan area networks (MANs), system area networks (SANs), a data over cable service interface specification (DOCSIS) network, a fiber optics network (for example, FTTH (fiber to the home) or FTTX (fiber to the x), or hybrid fiber-coaxial (HFC)), a digital subscriber line (DSL), a public switched data network (PSDN), a global Telex network, a cellular or mobile network, etc. for example.

The virtual reality device 110 can comprise an audio detection system 112, an audio output device 114, a display device 116, and an audio input device 118. The virtual reality device 110 can connect to one or more audio output systems 130, for example, via a connection 135. In one or more embodiments, connection 135 is a virtual connection, for example, the audio detection system 112 detects audio, such as via a microphone, over the air from the audio output system 130, for example, from a speaker. An audio output system 130 can comprise any of an audio playback device, an audio instrument, a multi-media device, a radio, a jukebox, a television, a soundbar, a smartphone, an IoT device, any device that comprises a speaker, earbuds, an amplifier, headphones, a camera, record player, a cassette player, a smartwatch, a musical instrument, one or more users capable of providing audio (for example, one or more musicians, one or more singers, or both), any other audio output device, or any combination thereof. The virtual reality device 110 receive an audio input, for example, ambient audio, via connection 135 from the audio output system 130. The virtual reality device 110 can output audio via the audio output device 114. For example, the audio can comprise any of the audio input received from the audio output system 130, amplified audio (such as amplification of the audio input received from the audio output system 130), one or more instructions associated with one or more virtual reality activities, any other audio, or any combination thereof.

In one or more embodiments, the virtual reality device 110 can detect an audio input via an audio detection system 112. Audio detection system 112 can comprise any of a microphone, a microphone array, a far field voice (FFV) solution, any other type of audio input receiver, or any combination thereof. The audio detection system 112 can detect, for example, a tempo associated with an audio input, such as any of a beat, a rhythm, or both. The tempo can be detected based on a time interval, for example, a beats per minute.

In one or more embodiments, the virtual reality device 110 can display information at a display device 116. The information can comprise any of a menu, a listing, one or more visual reality activities, any other data presentable via a visual interface, or any combination thereof. The display device 116 can be included as part of an interior of the virtual reality device 110 such that the display device 116 is only visible to a user of the virtual reality device 110.

Figure 2:
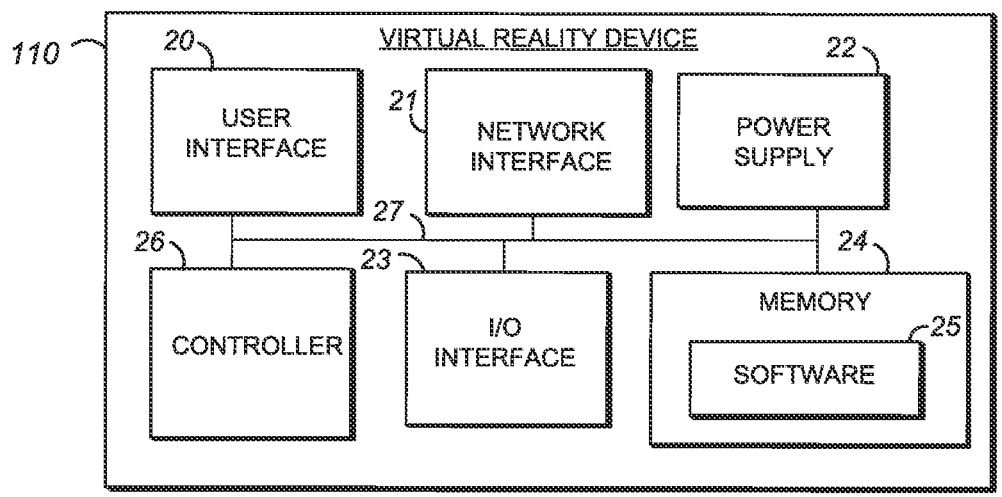
FIG. 2 is a more detailed block diagram illustrating various components of a virtual reality device, according to one or more aspects of the present disclosure.

FIG. 2 is a more detailed block diagram illustrating various components of an exemplary virtual reality device 110, according to one or more aspects of the present disclosure. The virtual reality device 110 includes one or more internal components, such as a user interface 20, a network interface 21, a power supply 22, a controller 26, an input/output (I/O) interface 23, a memory 24, and a bus 27 interconnecting the one or more elements.

The power supply 22 supplies power to the one or more internal components of the virtual reality device 110 through the internal bus 27. The power supply 22 can be a self-contained power source such as a battery pack with an interface to be powered through an electrical charger connected to an outlet (for example, either directly or by way of another device). The power supply 22 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The user interface 20 includes, but is not limited to, push buttons, a keyboard, a keypad, a controller (such as a game controller and/or remote control), a liquid crystal display (LCD), a thin film transistor (TFT), a light-emitting diode (LED), a sensor (such as a motion sensor for detection of any of a gaze, an eye movement, a hand gesture, any other movement of a user, or any combination thereof), a high definition (HD) or other similar display device including a display device having touch screen capabilities so as to allow interaction between a user and the virtual reality device 110, for example, for a user to select one or more virtual reality activities. The network interface 20 can include, but is not limited to, various network cards, interfaces, and circuitry implemented in software and/or hardware to enable communications with and/or between another device, such as an ISP 120, a network resource 160, an audio output system 130, any other device, or any combination thereof.

The memory 24 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), an optical storage system, a hard disk or any other various layers of memory hierarchy. The memory 24 can be used to store any type of instructions, software, or algorithms including software 25, for example, an audio detection system 112 for detecting audio input, a virtual reality activity selection system for selection of a virtual reality activity based on a determined tempo and/or a user input, any other software, or any combination thereof, in accordance with one or more embodiments.

The controller 26 controls the general operations of the network device 200 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software including the software 25 which can include a multi-modal portal application in accordance with one or more embodiments. Communication between the components (for example, 20-25) of the virtual reality device 110 may be established using an internal bus 27.

The network interface 21 can include various network cards, interfaces, and circuitry implemented in software and/or hardware to enable communications with any one or more other devices, for example, any of an audio output system 130, ISP 120, any other network device, or any combination thereof. For example, the network interface 21 can include multiple radios or sets of radios (for example, a 2.4 GHz radio, one or more 5 GHz radios, and/or a 6 GHz radio), which may also be referred to as wireless local area network (WLAN) interfaces.

The I/O interface 23 may include various network cards, and circuitry implemented in software and/or hardware to enable communications with a user, for example, via a display device 116. The I/O interface 23 can comprise any of a controller (such as a game controller, a remote control, etc.), a button, a sensor, a speaker, a microphone, any other I/O interface, or any combination thereof.

Figure 3:
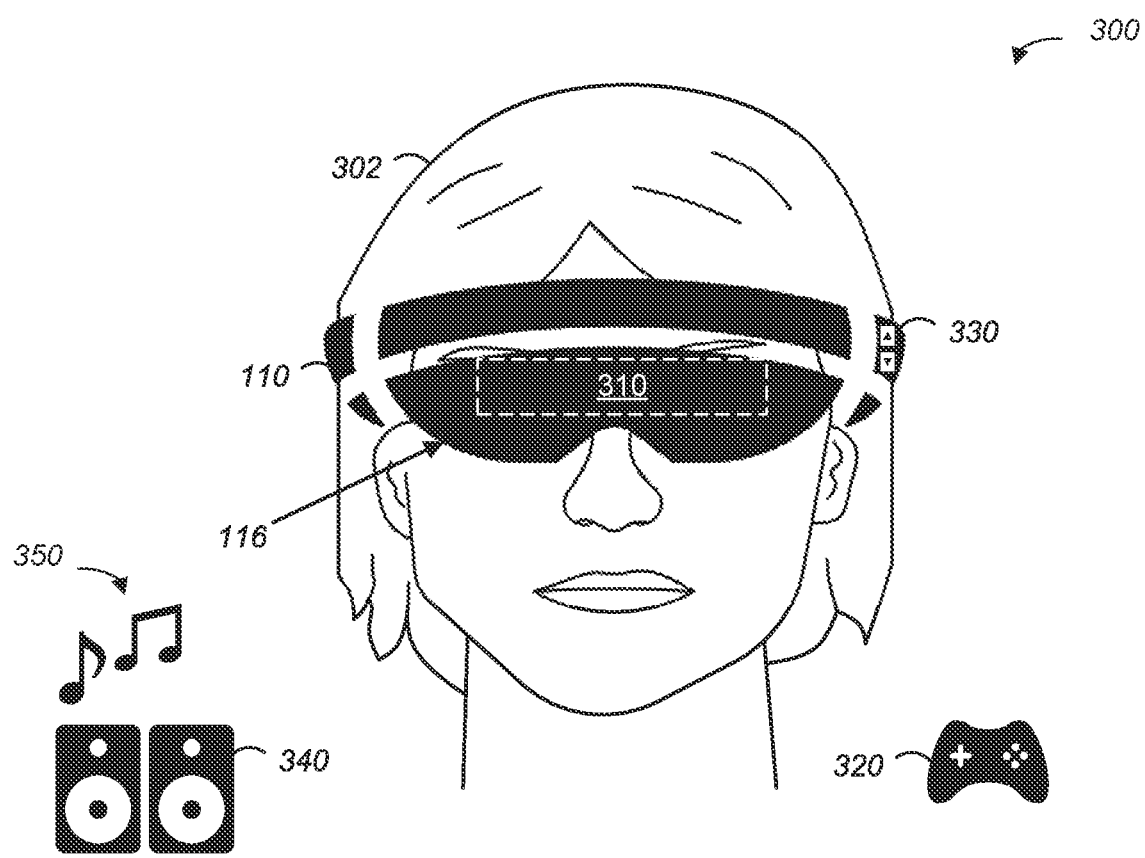
FIG. 3 is an illustration of a virtual reality environment, according to one or more aspects of the present disclosure.

FIG. 3 illustrates a virtual reality environment 300, according to one or more aspects of the present disclosure. The virtual reality environment 300 comprises a user 302 having a virtual reality device 110 disposed about a head of the user 302, for example, wearing a virtual reality device 110 as a goggle or headset. Virtual reality device 110 can comprise one or more user inputs 330 (for example, as part of an I/O interface 23) and a visual interface 310 (for example, as part of a display device 116 and/or user interface 20). In one or more embodiments, the user 302 can utilize controller 320 as an I/O interface 23. Any of the one or more user inputs 330, the controller 320, a gaze of the user 302, any other user input, or any combination thereof can be used by the user 302 to select a virtual reality activity displayed to the user 302 via the visual interface 310. In one or more embodiments, the virtual reality device 110 can automatically select a virtual reality activity based on detected or determined tempo of an audio input, such as ambient audio 350, from an audio output system 130, such as a speaker 340.

Figure 4:
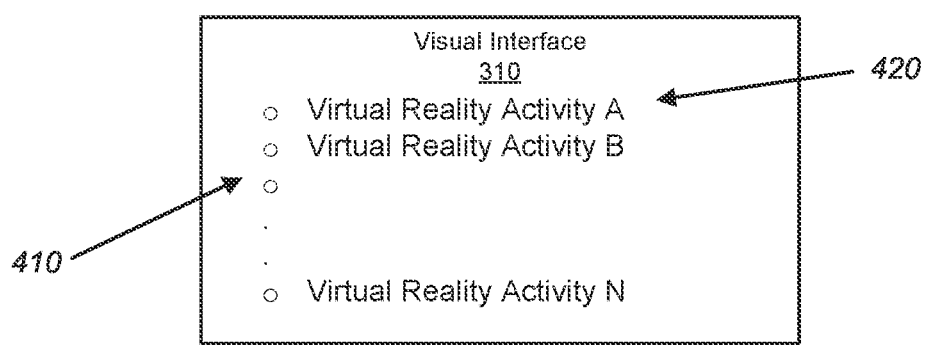
FIG. 4 is an illustration of a visual interface of a virtual reality device, according to one or more aspects of the present disclosure.

FIG. 4 is an illustration of a visual interface 310 of a virtual reality device 110, according to one or more aspects of the present disclosure. The visual interface 310 can display, for example, at a display device 116, one or more items 420 in a dialog box 410. The one or more items can comprise, for example, one or more virtual reality activities that are available for selection by a user 302 based on a detected tempo of audio input, such as ambient audio 350. For example, the one or more virtual reality activities can be associated with a tempo. For example, Virtual Reality Activity A can be associated with a first tempo (for example, a slow tempo for a low impact activity), Virtual Reality Activity B can be associated with a second tempo (for example, a medium tempo for a moderate impact activity), and Virtual Reality Activity N can be associated with a third tempo (for example, a fast tempo for a high impact activity). In this way, any virtual reality activity can be associated with a tempo or one or more tempos so as to provide a user 302 with a selection of one or more virtual reality activities that correspond to a given tempo. As another example, Virtual Activity A, Virtual Reality Activity B and Virtual Reality Activity N can all be associated with the same tempo such that the virtual reality device displays the one or more virtual reality activities based on the detected tempo. In one or more embodiments, one or more tempos can correspond to a numerical value and the one or more virtual reality activities are associated with the numerical value corresponding to an appropriate tempo. In one or more embodiments, the virtual reality device 110 automatically selects a virtual reality activity based on the detected or determined tempo. In one or more embodiments, the virtual reality activity is synchronized with the detected or determined tempo.

Figure 5:
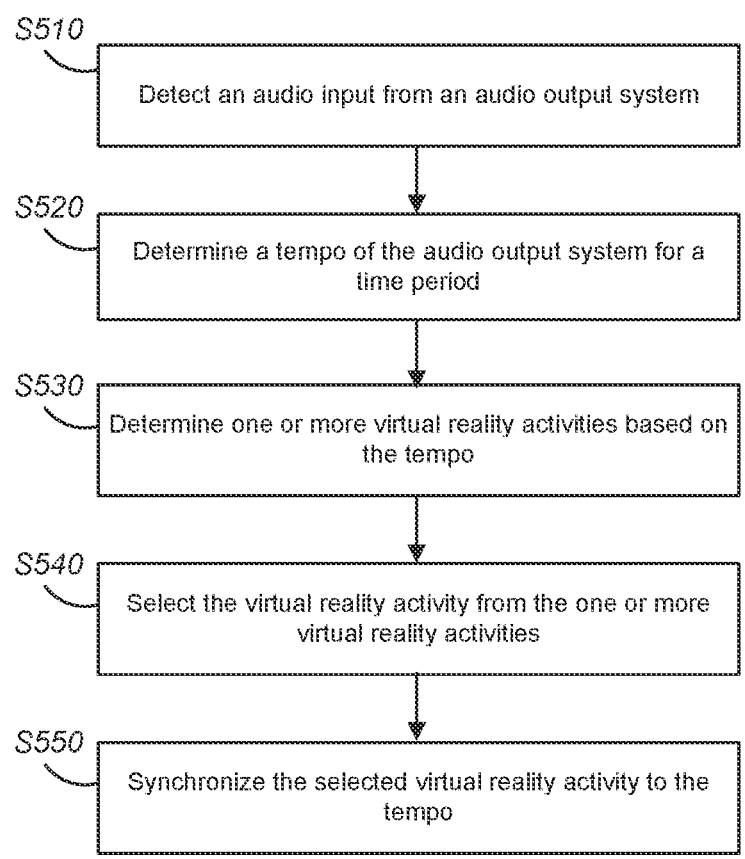
FIG. 5 illustrates a process for selecting a virtual reality activity, according to one or more aspects of the present disclosure.

FIG. 5 is a flow chart illustrating a method for selecting a virtual reality activity, according to one or more aspects of the present disclosure. The virtual reality device 110 may be programmed with one or more instructions that when executed by a processor or controller causes the virtual reality device 110 to select a virtual reality activity based on a tempo of an audio input. In FIG. 5, it is assumed that the virtual reality device 110 includes a respective controller and a respective software stored in a respective memory, as discussed above in connection with FIGS. 1-4, which when executed by the respective controller performs the functions and operations in accordance with the example embodiments of the present disclosure.

The virtual reality device 110 comprises a controller 26 that executes one or more computer-readable instructions, stored on a memory 24, that when executed perform one or more of the operations of steps S510-S550. The virtual reality device 110 can comprise one or more software 25. While the steps S510-S550 are presented in a certain order, the present disclosure contemplates that any one or more steps can be performed simultaneously, substantially simultaneously, repeatedly, in any order or not at all (omitted).

At step S510, the virtual reality device 110 detects an audio input from an audio output system 130. For example, the virtual reality device 110 can detect ambient audio (music) 350 from a speaker 340 that is within proximity of a user 302 of the virtual reality device 110. The virtual reality device 110 can detect the audio input using an audio detection system 112. In one or more embodiments, the audio detection system 112 is local to or within the virtual reality device 110 as illustrated in FIG. 1 or external to or otherwise coupled to the virtual reality device 110. The audio detection system 112 can comprise an audio receiver, such as a microphone, that is used to detect the audio input.

At step S520, the virtual reality device 110 determines a tempo of the audio input for a time period. The time period can be any increment of time. For example, the virtual reality device 110 can determine the tempo as a beats per minute and the time period comprises at least one minute. In one or more embodiments, the tempo can be determined based on a periodic pattern. For example, the virtual reality device 110 can identify one or more amplitude peaks in the audio input and determine that the one or more amplitude peaks occur in a periodic pattern.

At step S530, the virtual reality device 110 determines one or more virtual reality activities based on the tempo. For example, one or more virtual reality activities can be associated with a tempo. Once the virtual reality device 110 determines the tempo, the virtual reality device 110 can determine which of the one or more virtual reality activities is associated with the determined tempo. In one or more embodiments, the tempo is determined periodically or at timed intervals such that if the tempo changes, the virtual reality device 110 can determine one or more virtual reality activities based on the new or changed tempo. For example, a tempo of an audio input may be slow so as to be associated with a low impact virtual reality activity, the tempo can change to a medium tempo that is associated with a moderate impact virtual reality activity, then the tempo can change to a faster tempo that is associated with a high impact virtual reality activity, then the tempo can revert to the original slow tempo so as to provide a user with a full range of activity. By detecting the tempo of the audio input, the virtual reality device can customize an experience for a user.

At step S540, the virtual reality device 110 can select a virtual reality activity from the one or more virtual reality activities. The virtual reality device 110 can automatically and/or allow a user 302 to select the virtual reality activity. In one or more embodiments, the one or more virtual reality activities can be ranked according to one or more preferences of a user 302 and then if a plurality of virtual reality activities are associated with a tempo the virtual reality device 110 can select the virtual reality activity based on the one or more user preferences. In one or more embodiments, a history of the one or more virtual reality activities is maintained in a memory 24 such that if a plurality of virtual reality activities are associated with a tempo the virtual reality device 110 can select a virtual reality activity for the tempo based on one or more historical data such as any of a frequency, a most used, least used, latest used, recently used, any other historical data, or any combination thereof. In one or more embodiments, a user 302 can select from one or more virtual reality activities presented via a visual interface 310 using any one or more user inputs.

At S550, the virtual reality device 110 synchronizes the selected virtual reality activity to the tempo. For example, the virtual reality device 110 can present instructions for movement to the user via the display device 116.

Figures 6, 7:
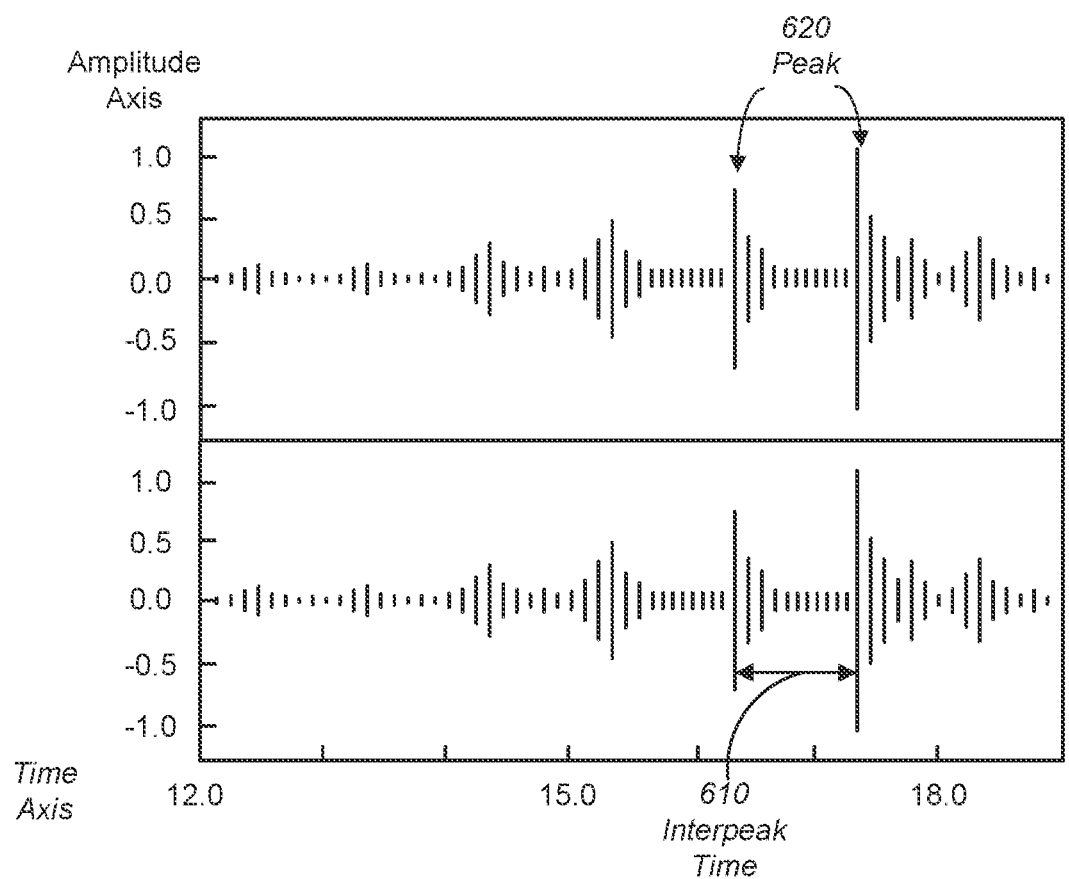
FIG. 6 illustrates an audio input detected by an audio detection system, according to one or more aspects of the present disclosure.
FIG. 7 illustrates audio synchronization data, according to one or more aspects of the present disclosure.

For example, FIG. 6 illustrates an audio input detected by an audio detection system 112, according to one or more aspects of the present disclosure. One or more peaks 620 are detected as a local maxima. The interpeak time 610 is determined between one peak 620 and the next peak 620. When a predetermined number of peaks 620 (for example, four peaks) appear consecutively with an interpeak time 610 within a predetermined threshold (for example, the distance between each peak 620 is 480 milliseconds +/−3 percent), then this interpeak time 610 is determined as the tempo of the audio input.

To determine when the next beat will occur, a real-time clock (RTC) may be used to synchronize, for example, a virtual reality activity to the audio input (for example, an ambient audio). The RTC may be integrated into controller 26. The RTC may be a free running counter incremented once per time interval, for example, once each millisecond. The current RTC value may be made available to a software 25 executing on the virtual reality device 110 via an application programming interface (API), interrupt service routine (ISR), or any other suitable mechanism so as to synchronize one or more virtual reality activities to the audio input, for example, a tempo associated with the audio input.

The audio detection system 112 has access to the current RTC value. Once the audio detection system 112 establishes an interpeak time X, the audio detect system 112 determines the value T of the RTC at the time the last beat was detect. The audio detection system 112 then determines the RTC value F corresponding to the next beat in the future using Equation 1.

$$F=T+X$$ Equation 1.

This RTC value F can be included in a data structure, for example, as illustrated in FIG. 7. FIG. 7 illustrates an example of audio synchronization data 700, according to one or more aspects of the present disclosure. The audio synchronization data 700 can be included in a data structure. The audio synchronization data can comprise an interpeak time 610 and an RTC next peak estimate (F). As discussed with respect to FIG. 6, if the interpeak time 610 is determined to be 480 milliseconds, and the RTC value is 838,902, then F can be determined using Equation 1 to be 838,902+480=839382. This audio synchronization data 700 can be provided to the software 25 via an API, an ISR, or any other method. The software 25 can then set an internal timer to start a selected virtual reality activity at the time of the RTC next peak estimate (F). In this way, a selected virtual reality activity starts at the next beat of the audio input (for example, the next beat of an ambient audio).

According to one or more example embodiments of inventive concepts disclosed herein, there are provided novel solutions for selecting a virtual reality activity for a virtual reality device based on a tempo of an audio input. The novel solutions according to example embodiments of inventive concepts disclosed herein provide features that enhance the user experience for a virtual reality device by providing a virtual reality activity based on a tempo of an audio input without requiring a subscription and/or licensing service.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What I claim is:

1. A virtual reality device for selecting a virtual reality activity, the virtual reality device comprising:
 a memory; and
 a processor configured to execute one or more instructions stored on the memory to cause the virtual reality device to:
  detect an audio input from an audio output system connected to the virtual reality device that is within proximity of a user;
  identify a plurality of amplitude peaks in the audio input;
  determine an interpeak time between a first peak of the plurality of amplitude peaks and a second peak of the plurality of amplitude peaks;
  determine that a number of the plurality of amplitude peaks occur in a periodic pattern consecutively with the interpeak time within a threshold;
  determine a tempo of the audio input for a time period, wherein the tempo is determined based on the interpeak time and the determination that the number is within the threshold;
  determine one or more virtual reality activities based on the tempo, wherein the one or more virtual reality activities are associated with one or more tempos, and wherein the tempo is one of the one or more tempos;
  select the virtual reality activity from the one or more virtual reality activities based on one or more preferences of the user; and
  synchronize the selected virtual reality activity to the tempo.

2. The virtual reality device of claim 1, wherein the tempo is determined as a beats per minute.

3. The virtual reality device of claim 2, wherein the time period comprises at least one minute.

4. The virtual reality device of claim 1, wherein the audio input comprises ambient audio.

5. The virtual reality device of claim 1, wherein the processor is further configured to execute the one or more instructions to further cause the client device to:
 provide to a display device of the virtual reality device a visual interface, wherein the visual interface comprises a listing of the one or more virtual reality activities.

6. The virtual reality device of claim 5, wherein selecting the virtual reality activity comprises receiving a user input from the visual interface, wherein the user input is associated with the selected virtual reality activity.

7. The virtual reality device of claim 1, wherein the processor is further configured to execute the one or more instructions to further cause the client device to:
 determine a changed tempo of the audio input for a second time period;
 determine one or more second virtual reality activities based on the changed tempo, wherein the one or more second virtual reality activities are associated with one or more second tempos, and wherein the changed tempo is one of the one or more second tempos;
 select a second virtual reality activity from the one or more second virtual reality activities based on one or more preferences of the user; and
 synchronize the selected second virtual reality activity to the changed tempo.

8. A method by a virtual reality device to select a virtual reality activity, the method comprising:
 detecting an audio input from an audio output system connected to the virtual reality device that is within proximity of a user;
 identifying a plurality of amplitude peaks in the audio input;
 determining an interpeak time between a first peak of the plurality of amplitude peaks and a second peak of the plurality of amplitude peaks;
 determining that a number of the plurality of amplitude peaks occur in a periodic pattern consecutively with the interpeak time within a threshold;
 determining a tempo of the audio input for a time period, wherein the tempo is determined based on the interpeak time and the determination that the number is within the threshold;
 determining one or more virtual reality activities based on the tempo, wherein the one or more virtual reality activities are associated with one or more tempos, and wherein the tempo is one of the one or more tempos;
 selecting the virtual reality activity from the one or more virtual reality activities based on one or more preferences of the user; and
 synchronizing the selected virtual reality activity to the tempo.

9. The method of claim 8, wherein the tempo is determined as a beats per minute.

10. The method of claim 9, wherein the time period comprises at least one minute.

11. The method of claim 8, wherein the audio input comprises ambient audio.

12. The method of claim 8, further comprising:
 providing to a display device of the virtual reality device a visual interface, wherein the visual interface comprises a listing of the one or more virtual reality activities.

13. The method of claim 12, wherein selecting the virtual reality activity comprises receiving a user input from the visual interface, wherein the user input is associated with the selected virtual reality activity.

14. The method of claim 8, further comprising:
 determining a changed tempo of the audio input for a second time period;
 determining one or more second virtual reality activities based on the changed tempo, wherein the one or more second virtual reality activities are associated with one or more second tempos, and wherein the changed tempo is one of the one or more second tempos;
 selecting a second virtual reality activity from the one or more second virtual reality activities based on one or more preferences of the user; and
 synchronizing the selected second virtual reality activity to the changed tempo.

15. A non-transitory, computer-readable medium of a virtual reality device storing one or more computer-readable instructions for selecting a virtual reality activity that when executed by a processor, cause the processor to perform one or more operations comprising:
 detecting an audio input from an audio output system connected to the virtual reality device that is within proximity of a user;

identifying a plurality of amplitude peaks in the audio input;
determining an interpeak time between a first peak of the plurality of amplitude peaks and a second peak of the plurality of amplitude peaks;
determining that a number of the plurality of amplitude peaks occur in a periodic pattern consecutively with the interpeak time within a threshold;
determining a tempo of the audio input for a time period, wherein the tempo is determined based on the interpeak time and the determination that the number is within the threshold;
determining one or more virtual reality activities based on the tempo, wherein the one or more virtual reality activities are associated with one or more tempos, and wherein the tempo is one of the one or more tempos;
selecting the virtual reality activity from the one or more virtual reality activities based on one or more preferences of the user; and
synchronizing the selected virtual reality activity to the tempo.

16. The non-transitory, computer-readable medium of claim 15, wherein at least one of:
wherein the tempo is determined as a beats per minute and the audio input comprises ambient audio.

17. The non-transitory, computer-readable media of claim 16, wherein the time period comprises at least one minute.

18. The non-transitory computer-readable media of claim 15, wherein the one or more computer-readable instructions when executed by the processor, further cause the processor to perform the one or more operations further comprising:
providing to a display device of the virtual reality device a visual interface, wherein the visual interface comprises a listing of the one or more virtual reality activities.

19. The non-transitory computer-readable media of claim 18, wherein selecting the virtual reality activity comprises receiving a user input from the visual interface, wherein the user input is associated with the selected virtual reality activity.

20. The non-transitory computer-readable media of claim 15, wherein the one or more computer-readable instructions when executed by the processor, further cause the processor to perform the one or more operations further comprising:
determining a changed tempo of the audio input for a second time period;
determining one or more second virtual reality activities based on the changed tempo, wherein the one or more second virtual reality activities are associated with one or more second tempos, and wherein the changed tempo is one of the one or more second tempos;
selecting a second virtual reality activity from the one or more second virtual reality activities based on one or more preferences of the user; and
synchronizing the selected second virtual reality activity to the changed tempo.

\* \* \* \* \*